United States Patent
Jahns

(10) Patent No.: US 10,555,499 B2
(45) Date of Patent: Feb. 11, 2020

(54) VEHICLE-MOUNTABLE SPREADER

(71) Applicant: Wilson Customs, Evant, TX (US)

(72) Inventor: Ethan Jay Jahns, Evant, TX (US)

(73) Assignee: Wilson Customs, Evant, TX (US)

( * ) Notice: Subject to any disclaimer, the term of this patent is extended or adjusted under 35 U.S.C. 154(b) by 340 days.

(21) Appl. No.: 15/695,495

(22) Filed: Sep. 5, 2017

(65) Prior Publication Data

US 2018/0064063 A1 Mar. 8, 2018

Related U.S. Application Data

(60) Provisional application No. 62/383,131, filed on Sep. 2, 2016.

(51) Int. Cl.
*A01K 5/02* (2006.01)
*A01K 39/014* (2006.01)

(52) U.S. Cl.
CPC .................. *A01K 5/0225* (2013.01)

(58) Field of Classification Search
CPC ........ A01K 5/001; A01K 5/02; A01K 5/0225; A01K 39/00; A01K 39/01; A01K 39/012; A01K 39/014
See application file for complete search history.

(56) References Cited

U.S. PATENT DOCUMENTS

| | | | | |
|---|---|---|---|---|
| 8,066,206 B1 * | 11/2011 | Cotham | .................. | A01C 7/02 239/653 |
| 8,474,735 B2 * | 7/2013 | Hobbs, Jr. | ............ | A01C 15/006 239/650 |
| 8,607,736 B1 * | 12/2013 | Plant | .................... | A01K 5/0225 119/57.91 |
| 2005/0241588 A1 * | 11/2005 | Foster | .................. | A01K 5/0225 119/57.91 |
| 2012/0085289 A1 * | 4/2012 | Quiring | ................ | A01K 5/0225 119/57.91 |
| 2014/0131468 A1 * | 5/2014 | Meritt | .................. | A01C 17/001 239/7 |

FOREIGN PATENT DOCUMENTS

| | | | | |
|---|---|---|---|---|
| EP | 704154 A2 * | 9/1995 | .............. | A01K 5/00 |
| EP | 1269835 A1 * | 1/2003 | .......... | A01K 5/0725 |
| EP | 1537777 A1 * | 6/2005 | ............ | A01K 5/004 |
| FR | 2766662 A1 * | 2/1999 | .......... | A01K 17/003 |
| JP | 2001061363 A * | 3/2001 | | |

* cited by examiner

*Primary Examiner* — Son T Nguyen
(74) *Attorney, Agent, or Firm* — Rodney J. Fuller; Booth Udall Fuller, PLC

(57) ABSTRACT

Vehicle-mountable animal feed spreader device for spreading feed for livestock, game animals, or other animals. The device is configured to mount to a vehicle. The device is also configured so that it can be activated while driving to spread feed. The animal feed spreader includes a hopper that funnels animal feed towards a spinning plate that is driven by a motor to spin. Animal feed falling through the hopper strikes the spinning plate as it spins, which spreads the animal feed away from the spinning plate as the vehicle moves or is stationary. A protective cage surrounds the spinning plate and may also operate as a pedestal or other base. The motor and spinning plate are attached to a removable floor of the hopper.

20 Claims, 6 Drawing Sheets

VEHICLE-MOUNTABLE SPREADER

RELATED APPLICATION

This application claims the benefit of U.S. Provisional Application No. 62/383,131, filed Sep. 2, 2016, titled "VEHICLE-MOUNTED SPREADER," the contents of which are herein expressly incorporated by reference for all purposes.

TECHNICAL FIELD

Aspects of this document relate generally to vehicle-mountable animal feed spreaders for use in spreading feed for livestock, game animals, or other animals.

BACKGROUND

Animal feed spreaders are commonly used to distribute animal feed to livestock or game animals. Some animal feed spreaders are mounted on a vehicle to allow the animal feed to be spread over a wider area or in areas inconvenient for stationary animal feed spreaders. Certain portions of the motor assembly of a conventional vehicle-mounted animal feed spreader are exposed and vulnerable to damage from debris, rocks, or the ground. A need exists for an improved vehicle-mounted animal feed spreader.

SUMMARY

A need exists for an improved vehicle-mountable animal feed spreader and a method for using the same. Accordingly, in an aspect, an animal feed spreader includes: an annular floor frame having an inner ring defining a first aperture, the annular floor frame having at least two fastening members, wherein the annular floor frame has a rectilinear shape; a hopper comprising sidewalls affixed to the annular floor frame, at least a portion of the sidewalls defining a funnel-shaped portion of the hopper above the annular floor frame; a floor plate removably coupled to the annular floor frame at the at least two fastening members, the floor plate having a second aperture with a circumference between 10 cm and 70 cm, wherein the circumference of the second aperture is less than half of the circumference of the first aperture, wherein the circumference of the second aperture entirely circumscribes and is no closer than 2 cm away from the circumference of the first aperture when the floor plate is coupled to the annular floor frame; an arm having a first end portion affixed to the floor plate and a second end portion of the arm affixed to a clamp assembly, the clamp assembly being substantially positioned over the second aperture; a motor releasably coupled to the clamp assembly with a bottom face of the motor at least 2 cm above the circumference of the second aperture, the motor having a drive shaft traversing both the bottom face of the motor and the second aperture; a spinning plate coupled to a distal end portion of the drive shaft opposite the bottom face of the motor, the spinning plate being at least 1 cm below the circumference of the second aperture, wherein the drive shaft and the spinning plate spin when the motor is in an active running state; a pedestal assembly coupled to the annular floor frame, the pedestal assembly having a plurality of supports encasing the spinning plate, each of the plurality of supports having a base, wherein each base of at least three supports of the plurality of supports is at least 4 cm below the spinning plate; a bash plate coupled to at least two of the plurality of supports, the bash plate being positioned directly below the spinning plate; and a hitch assembly having a proximal end portion coupled to at least one of the pedestal assembly or the annular floor frame, the hitch assembly having a tubular steel distal end portion operable to slide at least 5 cm into the tow hitch of the vehicle.

In some aspects, the floor plate has a floor plate circumference where the floor plate seats against the annular floor frame, the floor plate circumference being between 1.03 and 1.4 times larger than the circumference of the first aperture. In certain aspects, the animal feed spreader further includes an upper rim of the hopper comprising an upper portion of the sidewalls above the funnel-shaped portion of the hopper, the circumference of the upper rim being at least 1.5 times larger than the first aperture, the hopper having an internal volume of between 20 and 95 liters, wherein the floor plate is capable of being lifted through both the hopper and the upper rim when the floor plate is removed from the annular floor frame. In further aspects, the floor plate has a circumference larger than the circumference of the first aperture, and coupling the floor plate to the annular floor frame seals the first aperture except for the area where the second aperture overlaps the first aperture. In some aspects, the at least two fastening members are operable to uncouple the floor plate from the annular floor frame while the motor remains coupled to the clamp assembly. In certain aspects, the plurality of supports of the pedestal assembly further includes: a plurality of columnar supports coupled to the annular floor frame; a plurality of beam supports coupled to the plurality of columnar supports, the plurality of beam supports having a generally rectilinear toroidal shape.

In an aspect, an animal feed spreader includes: an annular floor frame having an inner ring defining a first aperture, the annular floor frame having at least two fastening members; a hopper comprising sidewalls coupled to the annular floor frame, at least a portion of the sidewalls defining a funnel-shaped portion of the hopper above the annular floor frame; a floor plate removably coupled to the annular floor frame at the at least two fastening members, the floor plate having a second aperture with a circumference that is less than half of the circumference of the first aperture; an arm having a first end portion affixed to the floor plate and a second end portion of the arm affixed to a clamp assembly; a motor releasably coupled to the clamp assembly with a bottom face of the motor at least 2 cm above the circumference of the second aperture, the motor having a drive shaft traversing both the bottom face of the motor and the second aperture; a spinning plate coupled to a distal end portion of the drive shaft opposite the bottom face of the motor, the spinning plate being at least 1 cm below the circumference of the second aperture, wherein the drive shaft and the spinning plate spin when the motor is in an active running state; a pedestal assembly coupled to the annular floor frame, the pedestal assembly encasing the spinning plate with a plurality of columnar supports and a plurality of beam supports, the plurality of columnar supports coupling the plurality of beam supports to the annular floor frame, wherein the plurality of beam supports has a generally rectilinear toroidal shape with a base that is at least 4 cm below the spinning plate; and a hitch assembly having a proximal end portion coupled to at least one of the pedestal assembly or the annular floor frame, the hitch assembly having a distal end portion operable to couple to the tow hitch of the vehicle.

In some aspects, the hitch assembly is coupled to at least one of the plurality of beam supports. In certain aspects, the animal feed spreader further includes an upper rim of the hopper comprising an upper portion of the sidewalls above the funnel-shaped portion of the hopper, the circumference of the upper rim being at least 1.5 times larger than the first aperture, wherein the floor plate is capable of being lifted through both the hopper and the upper rim when the floor plate is removed from the annular floor frame. In further aspects, the floor plate has a floor plate circumference where the floor plate seats against the annular floor frame, the floor plate circumference being between 1.03 and 1.4 times larger than the circumference of the first aperture. In certain aspects, the pedestal assembly further includes a bash plate coupled to at least two of the plurality of beam supports, the bash plate being positioned directly below the spinning plate. In some aspects, the floor plate has a circumference larger than the circumference of the first aperture, and coupling the floor plate to the annular floor frame seals the first aperture except for the area where the second aperture overlaps the first aperture. In further aspects, the floor plate is capable of being removed from the annular floor frame while the motor remains coupled to the clamp assembly.

In an aspect, an animal feed spreader includes: an annular floor frame having an inner ring defining a first aperture, the annular floor frame having at least two fastening members; a hopper comprising sidewalls coupled to the annular floor frame, at least a portion of the sidewalls defining a funnel-shaped portion of the hopper above the annular floor frame; that is less than two-thirds of the circumference of the first aperture; an arm having a first end portion affixed to the floor plate and a second end portion of the arm affixed to a clamp assembly; a motor releasably coupled to the clamp assembly with a bottom face of the motor at least 2 cm above the circumference of the second aperture, the motor having a drive shaft traversing both the bottom face of the motor and the second aperture; a spinning plate coupled to a distal end portion of the drive shaft opposite the bottom face of the motor, the spinning plate being at least 1 cm below the circumference of the second aperture, wherein the drive shaft and the spinning plate spin when the motor is in an active running state; a pedestal assembly coupled to the annular floor frame, the pedestal assembly having a plurality of supports encasing the spinning plate, each of the plurality of supports having a base, wherein each base of at least three supports of the plurality of supports is at least 4 cm below the spinning plate; and a hitch assembly having a proximal end portion coupled to at least one of the pedestal assembly or the annular floor frame, the hitch assembly having a distal end portion operable to couple to the tow hitch of the vehicle.

In some aspects, the plurality of supports of the pedestal assembly further includes a first columnar support coupled to the annular floor frame; a second columnar support coupled to the annular floor frame; a first beam support coupled to the first columnar support; a second beam support coupled to the second columnar support; and a third beam support coupled to the first and second beam supports. In certain aspects, the plurality of supports of the pedestal assembly further includes a fourth beam support coupled to the first and second beam supports, wherein each of the first, second, third, and fourth beam supports are tubular steel. In further aspects, the pedestal assembly further includes a bash plate coupled to at least two of the first, second, or third beam supports, the bash plate being positioned directly below the spinning plate. In some aspects, the motor remains coupled to the clamp assembly when the floor plate is removed from the annular floor frame. In certain aspects, the floor plate has a circumference larger than the circumference of the first aperture, and coupling the floor plate to the annular floor frame seals the first aperture except for the area where the second aperture overlaps the first aperture. In further aspects, the plurality of supports of the pedestal assembly comprise a protective cage around the spinning plate, the protective cage being shaped and sized to strike a flat ground before the spinning plate strikes the flat ground when the pedestal assembly drops or moves towards the flat ground.

Aspects and applications of the disclosure are described below with reference to the Drawings and the Detailed Description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
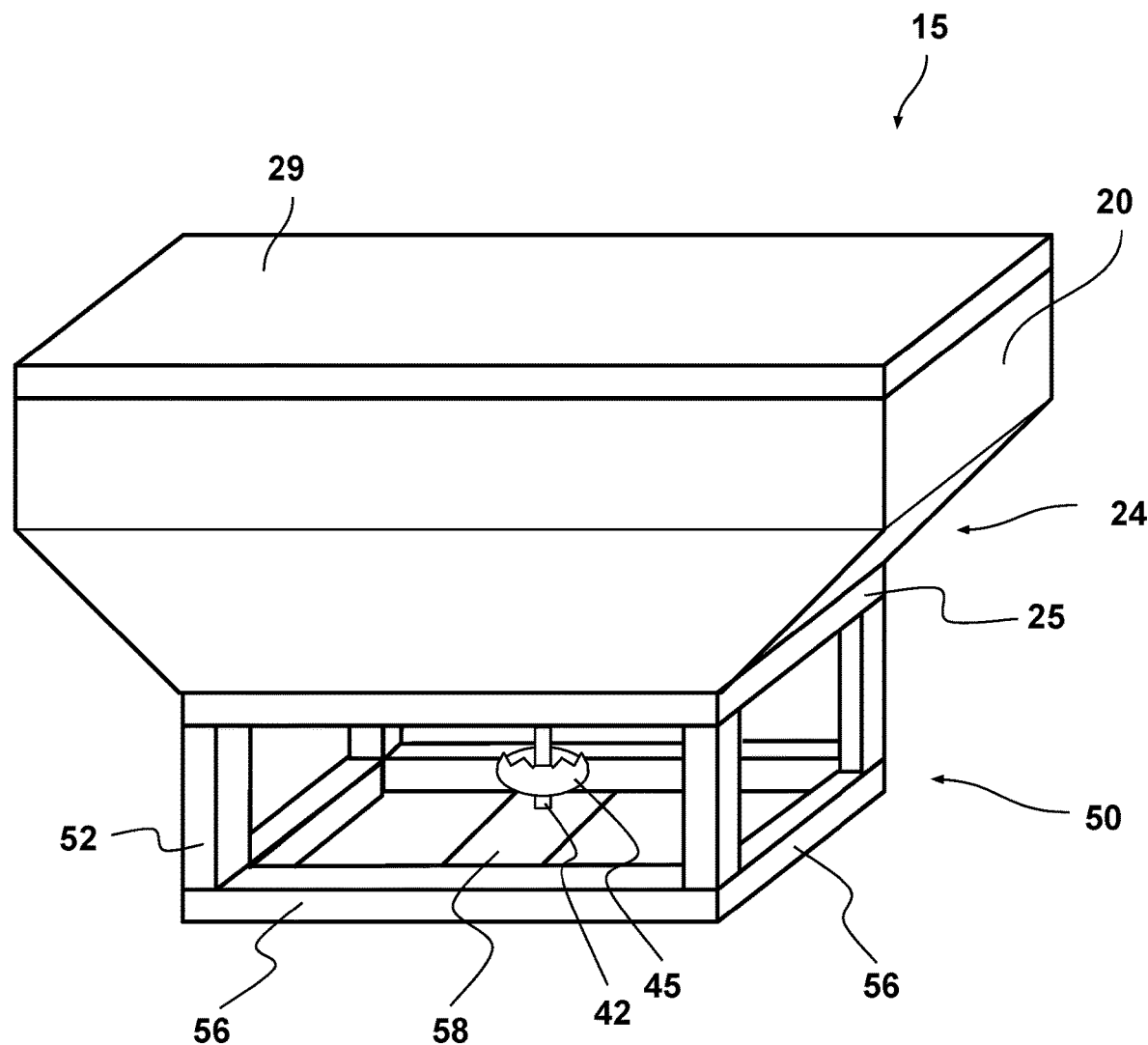
FIG. 1 illustrates a perspective view of a non-limiting implementation of an animal feed spreader.
Figure 2:
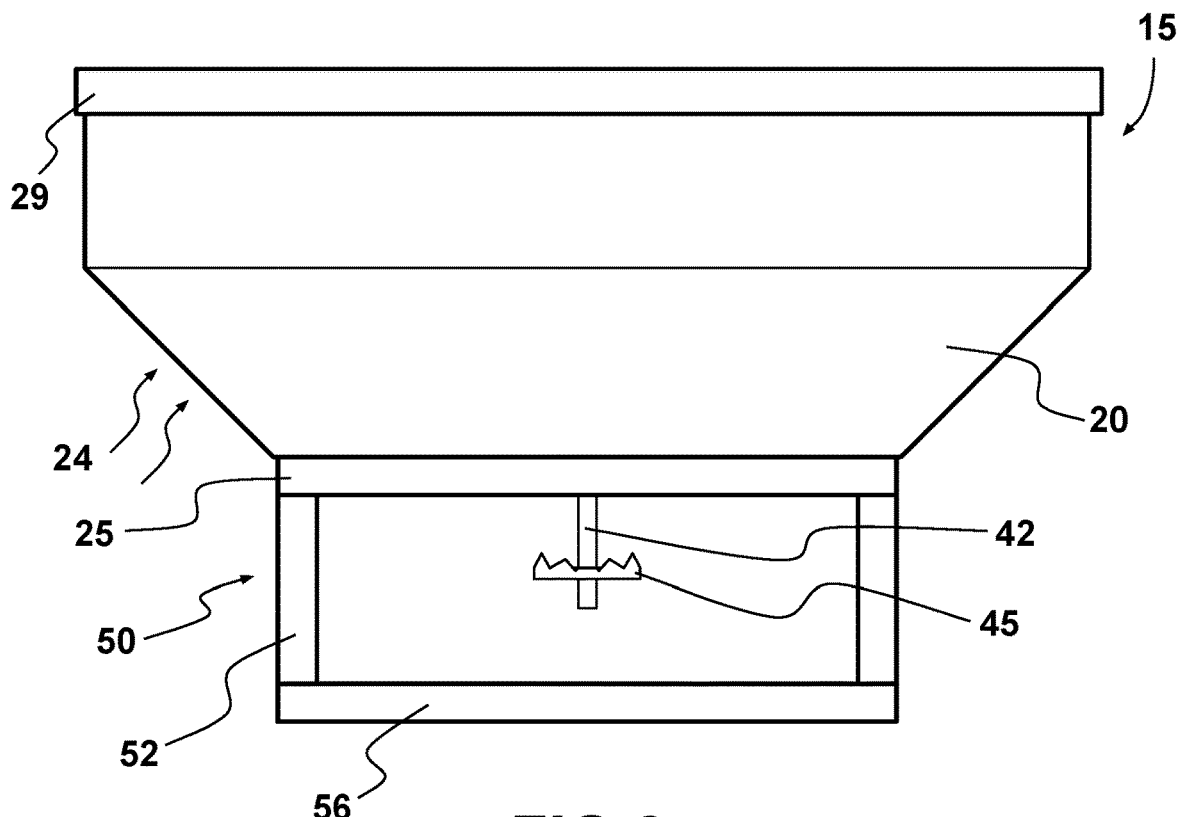
FIGS. 2-5 illustrate different side views of non-limiting implementations of an animal feed spreader.
Figure 3:
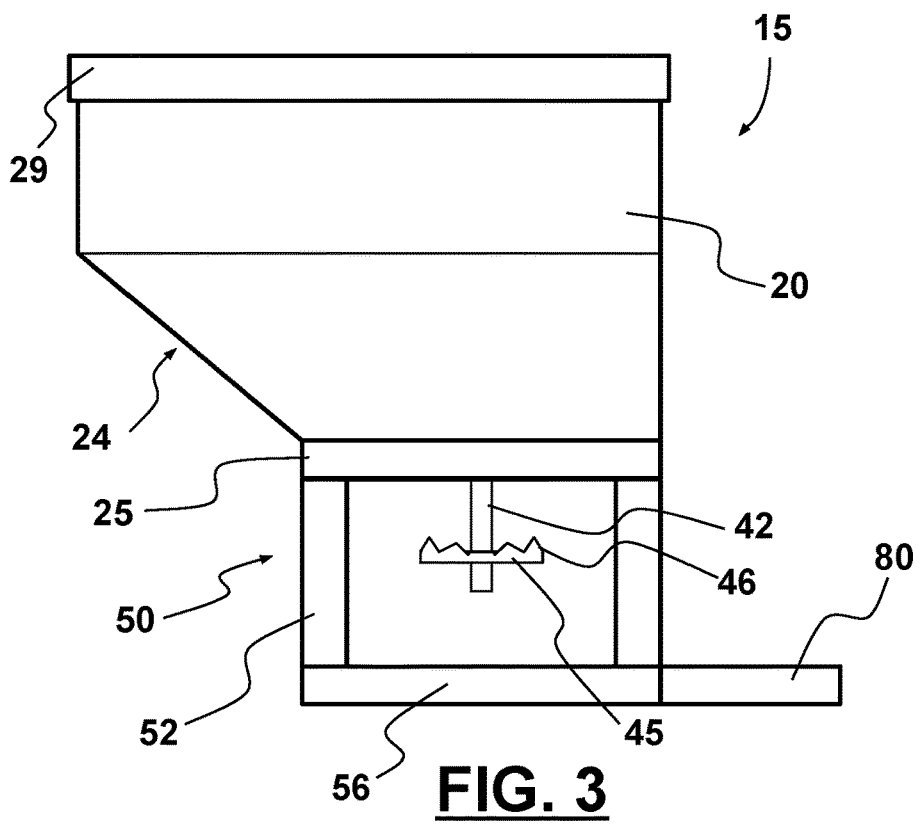
Figure 4:
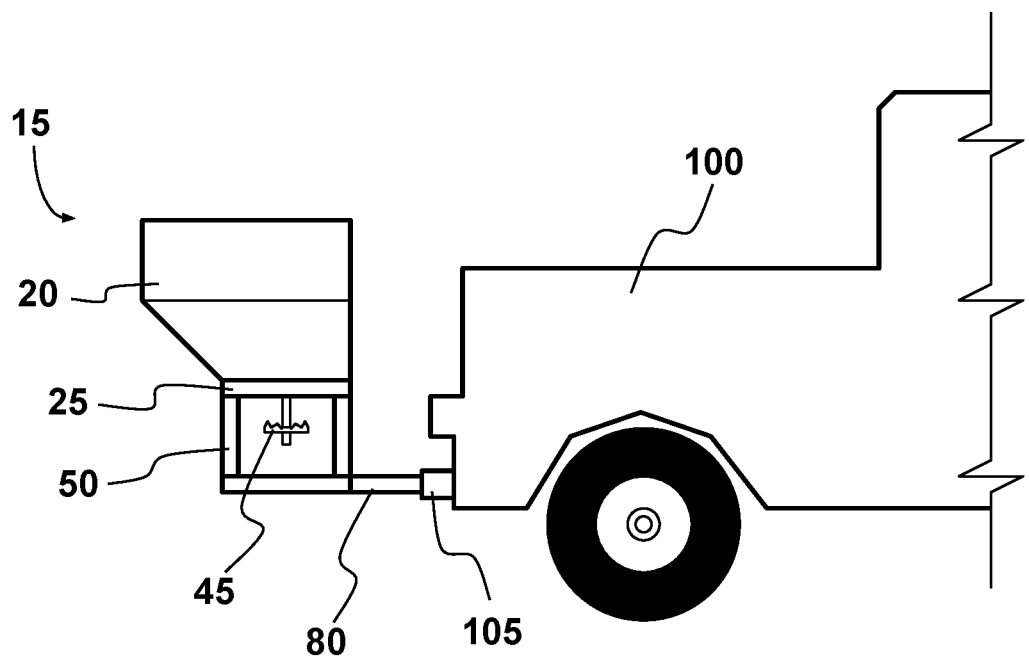
Figure 5:
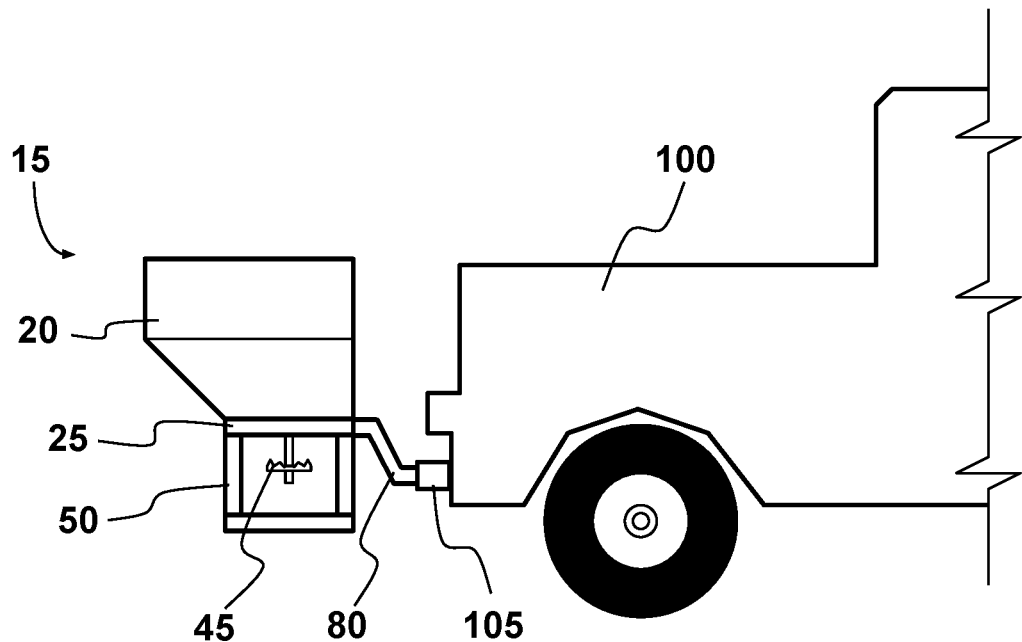

This document features a vehicle-mountable spreader or feeder (herein referred to as a spreader). In general, a vehicle-mountable spreader or feeder is used to broadcast animal feed (e.g., corn, deer feed, feed pellets, grains, etc.) over the ground for the animals (e.g., deer, livestock, cattle, fowl, chickens, game animals, other animals, etc.) to feed on. FIGS. 1-9 depict various implementations and views of the disclosed vehicle-mountable spreader 15. A vehicle-mountable spreader 15 may be mounted to a tow hitch assembly 105 of a vehicle 100, such as a 2" or 1.5" hitch on a truck, ATV, tractor, or other suitable vehicle. It is important to note that the tow hitch assembly 105 could be mounted on a vehicle 100 in the traditional back position, but also could be mount in the front or side position. The spreader 15 includes a tank or hopper 20 that houses the animal feed that is gravity fed into a funnel portion 24 positioned over an outlet 35 of the hopper 20. A motor 40 has a drive shaft 42 that traverses through the outlet 35 with a spinning plate 45 attached to the drive shaft 42. The motor 40 may be turned on from a switch (e.g., switch in the cab of a truck, a wireless switch, a switch on the spreader 15, or the like). When the motor 40 is activated (i.e., motor 40 is "on" and the drive shaft 42 is engaged and spinning), the spinning drive shaft 42 causes the spinning plate 45 to spin around. In numerous implementations, the spinning plate 45 includes ridges or other protrusions 46 on top or bottom side of the spinning plate 45. As gravity draws the animal feed through the hopper 20 and into the outlet 35, much of the falling animal feed will strike the spinning plate 45 and/or the protrusions 46 where the spinning motion of the spinning plate 45 (because the motor 40 is on and activated) will bounce and project the animal feed away from the spinning plate 45, thereby broadcasting the animal feed away from the spinning plate 45.

According to some aspects, a spreader 15 contemplated herein is advantageous to previous spreader or feeder devices because the disclosed spreader 15 provides all of the benefits of a traditional spreader or feeder devices (e.g., carrying animal feed in a hopper and adequately broadcasting the feed away from the spreader) while also providing supplemental strength to the spreader 15, additional protection of the motor 40 and/or spinning plate 45, a removable floor plate 30 attached to the motor 40, and adjustable mounting of the motor 40.

There are many features of spreader 15 implementations disclosed herein, of which one, a plurality, or all features or steps may be used in any particular implementation.

In the following description, reference may be made to the accompanying Figures which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Figure 6:
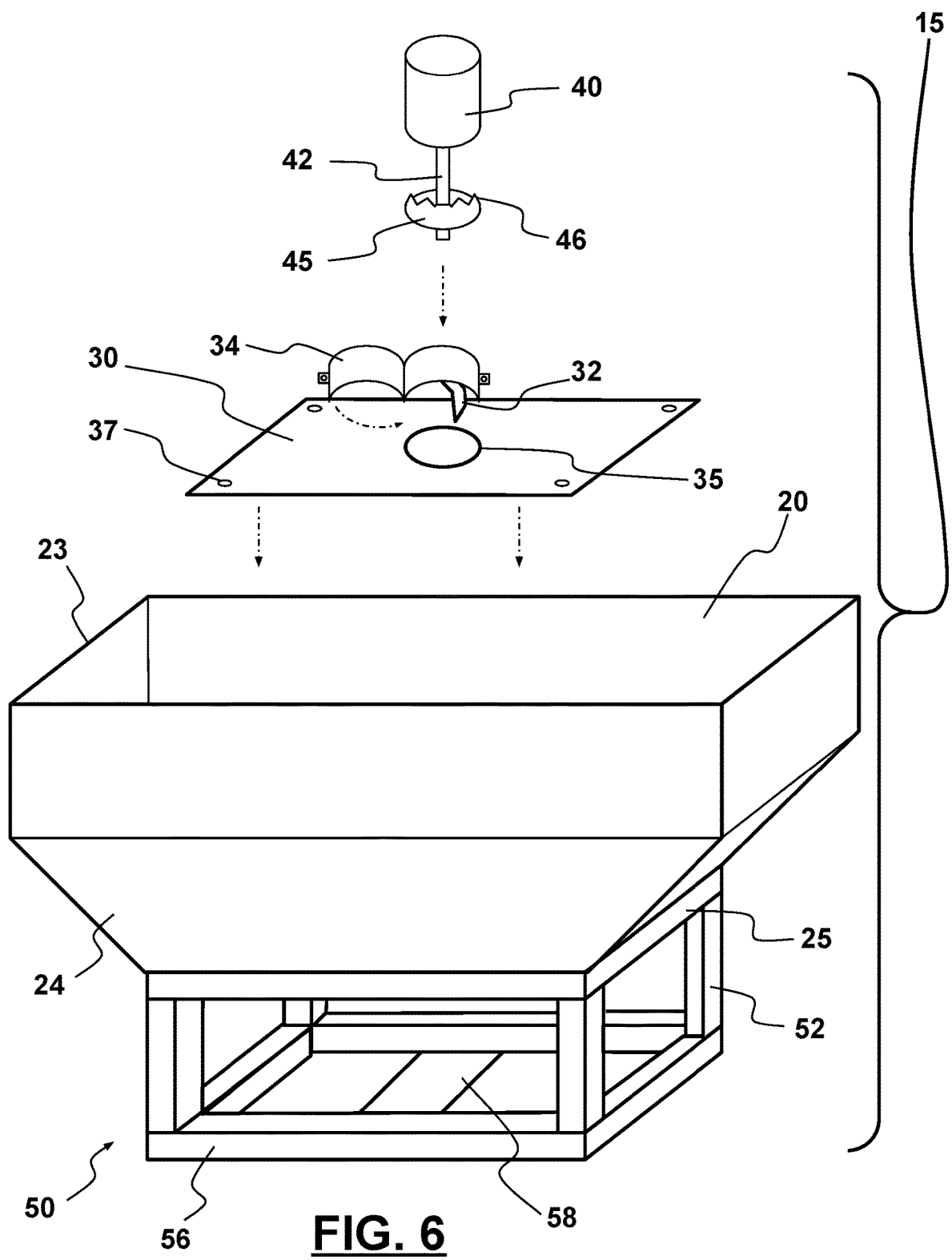
FIG. 6 illustrates a partially exploded perspective view of a non-limiting implementation of an animal feed spreader with the motor uncoupled from the clamp.
Figure 7:
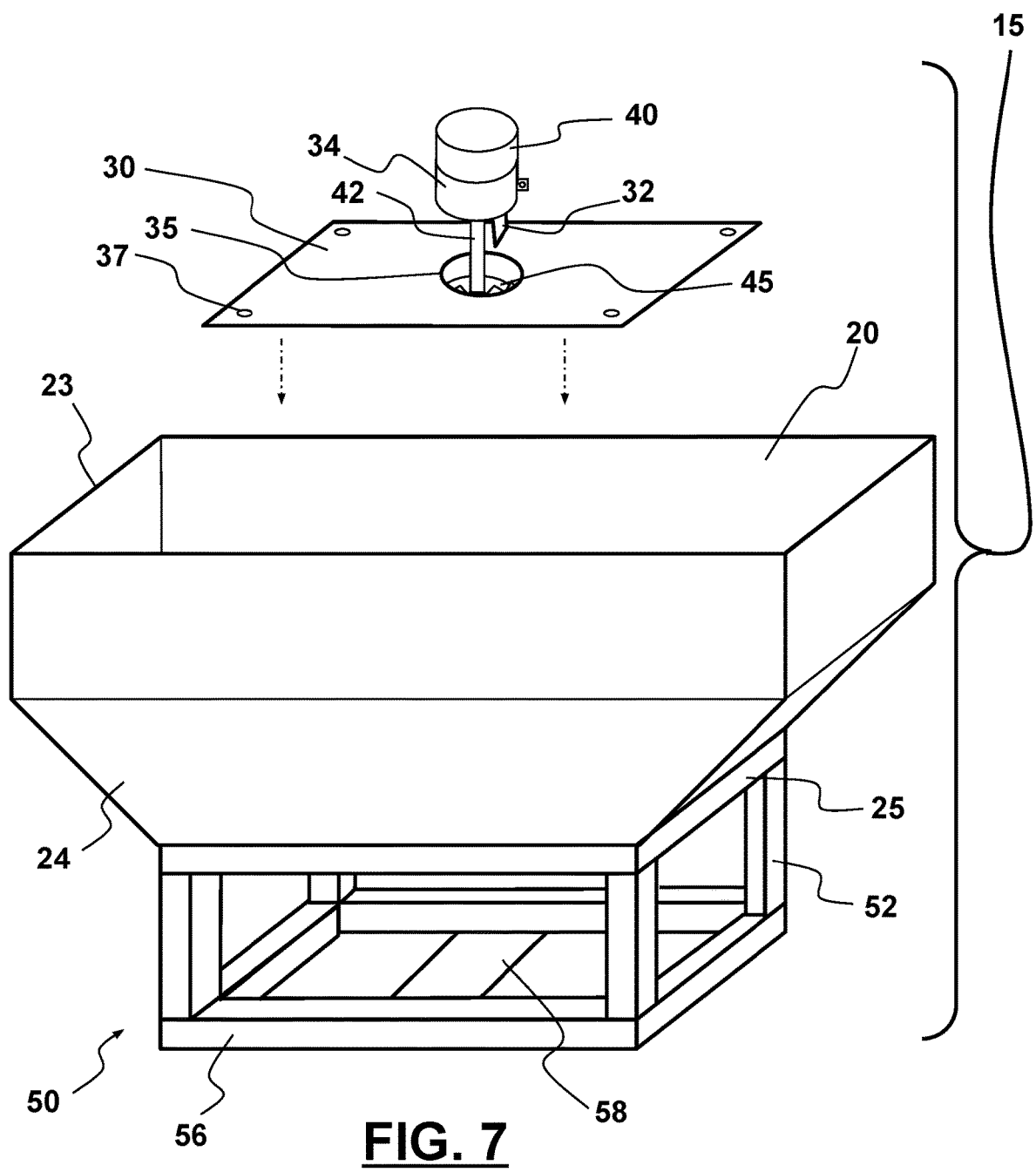
FIG. 7 illustrates a partially exploded perspective view of a non-limiting implementation of an animal feed spreader with the motor coupled to the clamp.
Figure 8:
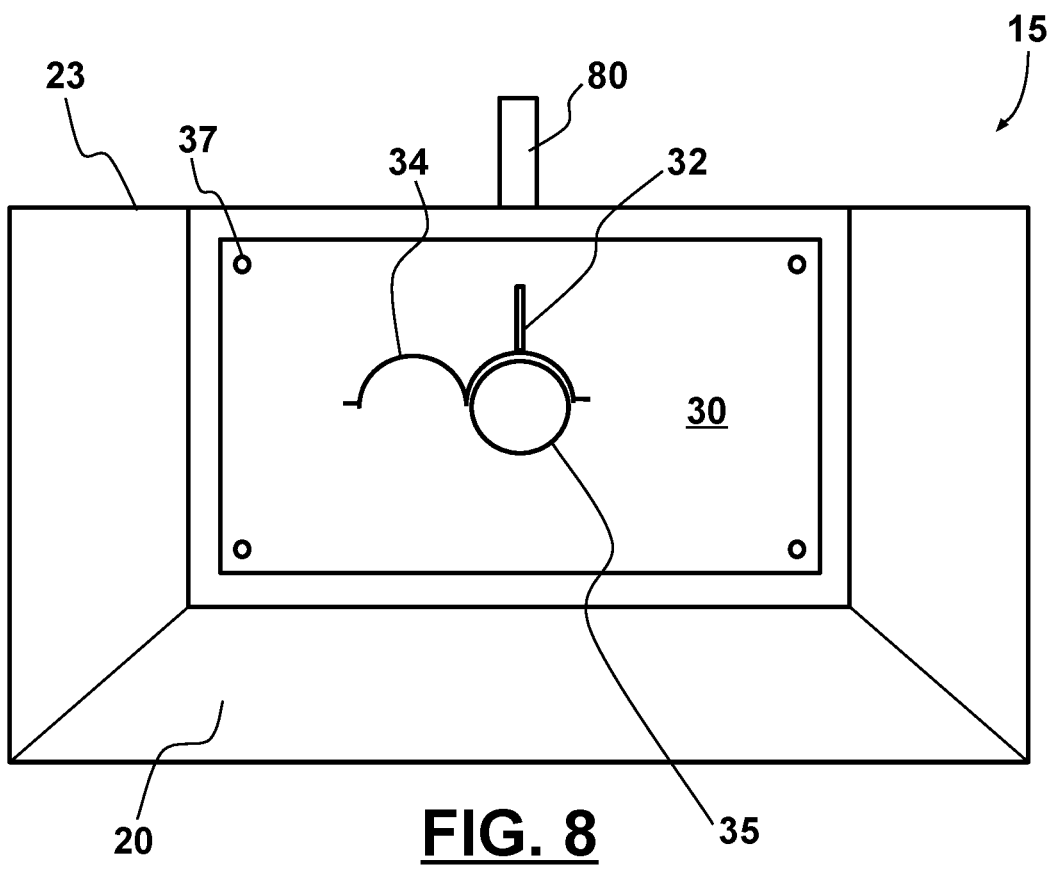
FIG. 8 illustrates a plan view of a non-limiting implementation of an animal feed spreader with the motor uncoupled from the clamp.
Figure 9:
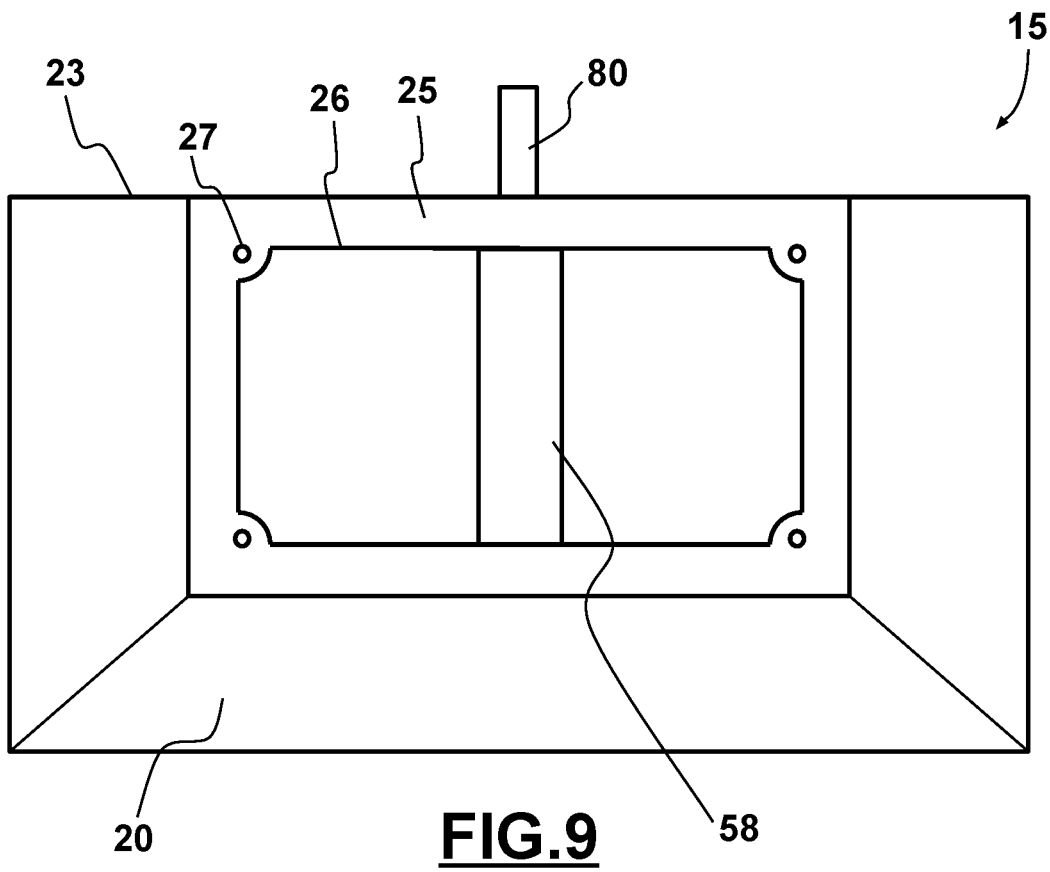
FIG. 9 illustrates a plan view of a non-limiting implementation of an animal feed spreader with the floor plate uncoupled from the annular floor frame.

FIG. 1 illustrates a perspective view of a non-limiting implementation of an animal feed spreader 15. FIGS. 2-5 illustrate different side views of non-limiting implementations of an animal feed spreader 15. FIG. 6 illustrates a partially exploded perspective view of a non-limiting implementation of an animal feed spreader 15 with the motor 40 uncoupled from the clamp 34. FIG. 7 illustrates a partially exploded perspective view of a non-limiting implementation of an animal feed spreader 15 with the motor 40 coupled to the clamp 34. FIG. 8 illustrates a plan view of a non-limiting implementation of an animal feed spreader 15 with the motor 40 uncoupled from the clamp 34. FIG. 9 illustrates a plan view of a non-limiting implementation of an animal feed spreader 15 with the floor plate 30 uncoupled from the annular floor frame 25.

Referring to FIGS. 1-9, the animal feed spreader 15 includes a hopper 20 with an internal volume capable of containing animal feed that is gravity fed into a funnel portion 24 positioned over an outlet 35 of the hopper 20. The internal volume of the hopper between the floor plate 30 on the bottom and the top rim 23 at the top may be from 10 to 200 liters (e.g., 10-175, 10-150, 10-100, 20-140, 20-95, 20-70, 30-60, or 30-80 liters) or sufficient volume to contain 20-210 lbs. (e.g., including one or more of 25 lbs., 50 lbs., 75 lbs., 100 lbs., and 150 lbs.) of animal feed. The animal feed spreader 15 includes a motor 40 having a rotating drive shaft 42 with a spinning plate 45 coupled to an end portion of the drive shaft 42 opposite the base (e.g., bottom face or lower surface) of the motor 40. The floor plate 30 and the outlet 35 are positioned between the spinning plate 45 and the motor 40. Thus, the spinning plate 45 is positioned outside of the hopper 20 while the motor 40 is housed within the interior of the hopper 20. The spinning plate 45 may include a plurality of protrusions 46. As the spinning plate 45 spins around, animal feed falling out of the outlet 35 of the hopper 20 is struck by the rotating spinning plate 45 and/or protrusions 46 and the animal feed is projected away from the spinning plate 45. The motor 40 is held in place by a clamp 34 that is connected to a removable floor plate 30 via an arm 32.

In some implementations, the hopper 20 includes a hopper lid 29. The hopper lid 29 may be removably coupled or adjustably coupled to hopper 20 near the rim 23 (e.g., hinged to one sidewall of hopper lid 29).

The floor plate 30 is removably coupled to the hopper 20 at an annular floor frame 25. The annular floor frame 25 has a generally annular shape, donut shape, or other shape with an aperture, hole, or other opening identified as aperture 26 in FIG. 9. The annular floor frame 25 includes a plurality of fastening members 27 (e.g., 2-5, 2-10, or 2-20 fastening members 27), which allow the floor plate 30 to securely couple to the annular floor frame 25. The fastening members 27 may be part of a fastening assembly 37. In some implementations, fastening members 27 are threaded bolt holes and each fastening assembly 37 includes a bolt that securely bolts the floor plate 30 to the annular floor frame 25. Each fastening member 27 and each fastening assembly 37 may be any one of different fasteners, latches, clasps, clamps, tongue-and-grooves, or other fastening assemblies. By coupling the floor plate 30 to the annular floor frame 25, the aperture 26 is covered or sealed except for the hole created by the outlet 35 in the floor plate 30. Thus, the only animal feed allowed to exit through the aperture 26 is the animal feed that exits through outlet 35. In some implementations, outlet 35 has a circumference between 10 cm and 150 cm (e.g., 10-125 cm, 10-100 cm, 10-70 cm, 10-50 cm, 10-40 cm, 10-25 cm, 10-18 cm, 15-30 cm, or 15-45 cm). In some implementations, the outlet 35 has a circumference that is three-fourth (e.g., two-third, one half, one-third, or one-fifth) of the circumference of aperture 26. In some implementations, the top rim 23 has a circumference that is between 1.03 and 1.7 times larger (e.g., 1.03-1.6, 1.03-1.5, 1.03-1.45, 1.03-1.4, 1.03-1.3, 1.03-1.2, or 1.03-1.1 times larger) than the circumference of aperture 26.

A pedestal assembly 50 is coupled to the hopper 20. In some implementations, pedestal assembly 50 is coupled to the annular floor frame 25. The entirety or a majority of the pedestal assembly 50 and annular floor frame 25 may be constructed of durable (e.g., metal) bars, tubing, beams, or the like. In some implementations, the pedestal assembly 50 and/or the annular floor frame 25 are primarily constructed of metal (i.e., metal, metal alloys, or the like) bars, tubing, beams, or the like. The pedestal assembly 50 is constructed as a protective cage around the spinning plate 45.

The spinning plate 45 is protected by the pedestal assembly 50 operating as a cage around the spinning plate 45. The protective cage structure of the pedestal assembly 50 may be formed using a plurality of beam supports 56, a plurality of columnar supports 52, and optionally a bash plate 58 coupled to two or more beam supports 56 (e.g. affixed to the base 59 of two opposing beam supports 56). The pedestal assembly 50 may be constructed entirely or mostly of steel tubing, such as 2" tubing, or steel tubing of another diameter (e.g., 1" to 4" tubing). The steel tubing (also called tubular steel) may have a rectilinear (e.g., square, triangular, etc.) or an elliptical (e.g., circle, ellipse, etc.) cross-section. Sturdy beams, plates, other tubing, bars, or the like may be used instead of tubular steel to construct at least the protective cage portion of the pedestal assembly 50. The pedestal assembly 50 may further include protective plates or shields (such as bash plate 58), which may have a strength sufficient to protect against large forces (e.g., rocks or the ground) or small forces (e.g., brush).

In operation, the protective cage structure of the pedestal assembly 50 is designed to strike objects before the object strikes or otherwise damages the spinning plate 45. For example, rocks or brush beneath a vehicle 100 will strike a bottom bar or member (e.g., beam support 56 or bash plate 58) of the pedestal assembly 50 instead of striking the spinning plate 45. Similarly, if the rear end of the vehicle 100 "bottoms out" by hitting the ground or an edge of a ditch, the bottom bars (e.g., beam supports 56) of the pedestal assembly 50 will bear the brunt of the force rather than an unprotected spinning plate 45. Existing spreader devices with an unprotected spinning plate can damage or even shear off an unprotected spinning plate (and possibly also the motor and/or drive shaft) in these instances.

In some implementations, the pedestal assembly 50 includes a plurality of beam supports 56 interconnected into a generally horizontal toroidal or donut shape, and the beam supports 56 couple to the annular floor frame 25 and/or the hopper 20 by way of a plurality of columnar supports 52. In some implementations, the beam supports 56 are tubular steel and the columnar supports 52 are made of steel, but not tubular steel. In alternative implementations, both the beam supports 56 and the columnar supports 52 are made of tubular steel.

A clamp assembly 34 is coupled to the floor plate 30 and shaped and sized to hold the motor 40 in place within the hopper 20 (e.g., within or below the funnel-shaped portion 24). The clamp assembly 34 includes at least one bolt, latch, clamp, clasp, cinch, tightener, or other fasteners that allow the clamp assembly 34 to be released or loosened so that the motor 40 may slide up or down, thereby positioning the spinning plate 45 closer to or farther from the bottom of the floor plate 30 and outlet 35. In some implementations, the motor 40 may slide up or down between 1 cm and 15 cm when the clamp assembly 34 is loosened. The clamp assembly 34 securely holds the motor 40 when the bolts or fasteners are tightened. The clamp assembly 34 may allow the motor 40 to be entirely removed from the clamp assembly 34 (which may also involve unhooking power and/or control wiring from the motor 40). In some implementations, the clamp assembly 34 includes a clamshell clamp. The clamp assembly 34 may also be another style of clamp or fastener adapted to hold the motor 40 securely in place.

The animal feed spreader 15 includes a hitch assembly 80 that mates with and is capable of coupling to a tow hitch 105 of a vehicle 100 (e.g., by sliding into the tow hitch 105 by at least 3-10 cm). In some implementations, the hitch assembly 80 is coupled to the pedestal assembly 50. In certain implementations, the hitch assembly 80 is coupled to the beam supports 56. In some implementations, the hitch assembly 80 is coupled to the hopper 20. In certain implementations, the hitch assembly 80 is coupled to the annular floor frame 25.

It will be understood that vehicle-mountable spreader 15 implementations are not limited to the specific assemblies, devices and components disclosed in this document, as virtually any assemblies, devices and components consistent with the intended operation of a vehicle-mountable spreader 15 implementation may be utilized. Accordingly, for example, although particular batteries, couplers, fasteners, power sockets, and other assemblies, devices and components are disclosed, such may include any shape, size, style, type, model, version, class, measurement, concentration, material, weight, quantity, and/or the like consistent with the intended operation of a vehicle-mountable spreader 15 implementation. Implementations are not limited to uses of any specific assemblies, devices and components; provided that the assemblies, devices and components selected are consistent with the intended operation of a vehicle-mountable spreader 15 implementation.

Accordingly, the components defining any vehicle-mountable spreader 15 implementations may be formed of any of many different types of materials or combinations thereof that can readily be formed into shaped objects provided that the components selected are consistent with the intended operation of a vehicle-mountable spreader 15 implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of a vehicle-mountable spreader 15 implementations may vary according to different implementations.

Various vehicle-mountable spreader 15 implementations may be manufactured using conventional procedures as added to and improved upon through the procedures described here. Some components defining vehicle-mountable spreader 15 implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of vehicle-mountable spreaders 15 are not limited to the specific order of steps as disclosed in this document. Any steps or sequence of steps of the assembly of vehicle-mountable spreaders 15 indicated herein are given as examples of possible steps or sequence of steps and not as limitations, since various assembly processes and sequences of steps may be used to assemble vehicle-mountable spreaders 15.

The vehicle-mountable spreader 15 implementations are described being used to broadcast animal feed over the ground for the animals to feed on. Nevertheless, implementations are not limited to uses relating to the foregoing. Rather, any description relating to the foregoing is for the exemplary purposes of this disclosure, and implementations may also be used with similar results for a variety of other applications requiring the broadcast of pellets, other articles with a diameter between 2 mm and 50 mm, or other articles that feed through a hopper. For example, implementations may be used to broadcast: fertilizer; pesticide; salt; sand; gravel; and so on.

What is claimed is:

1. An animal feed spreader for mounting to a tow hitch of a vehicle, the animal feed spreader comprising:
    an annular floor frame having an inner ring defining a first aperture, the annular floor frame having at least two fastening members, wherein the annular floor frame has a rectilinear shape;
    a hopper comprising sidewalls affixed to the annular floor frame, at least a portion of the sidewalls defining a funnel-shaped portion of the hopper above the annular floor frame;
    a floor plate removably coupled to the annular floor frame at the at least two fastening members, the floor plate having a second aperture with a circumference between 10 cm and 70 cm, wherein the circumference of the second aperture is less than half of the circumference of the first aperture, wherein the circumference of the second aperture entirely circumscribes and is no closer than 2 cm away from the circumference of the first aperture when the floor plate is coupled to the annular floor frame;
    an arm having a first end portion affixed to the floor plate and a second end portion of the arm affixed to a clamp assembly, the clamp assembly being substantially positioned over the second aperture;
    a motor releasably coupled to the clamp assembly with a bottom face of the motor at least 2 cm above the circumference of the second aperture, the motor having a drive shaft traversing both the bottom face of the motor and the second aperture;
    a spinning plate coupled to a distal end portion of the drive shaft opposite the bottom face of the motor, the spinning plate being at least 1 cm below the circumference of the second aperture, wherein the drive shaft and the spinning plate spin when the motor is in an active running state;
    a pedestal assembly coupled to the annular floor frame, the pedestal assembly having a plurality of supports encasing the spinning plate, each of the plurality of supports having a base, wherein each base of at least three supports of the plurality of supports is at least 4 cm below the spinning plate;
    a bash plate coupled to at least two of the plurality of supports, the bash plate being positioned directly below the spinning plate; and
    a hitch assembly having a proximal end portion coupled to at least one of the pedestal assembly or the annular floor frame, the hitch assembly having a tubular steel distal end portion operable to slide at least 5 cm into the tow hitch of the vehicle.

2. The animal feed spreader of claim 1, wherein the floor plate has a floor plate circumference where the floor plate seats against the annular floor frame, the floor plate circumference being between 1.03 and 1.4 times larger than the circumference of the first aperture.

3. The animal feed spreader of claim 2, further comprising:
    an upper rim of the hopper comprising an upper portion of the sidewalls above the funnel-shaped portion of the hopper, the circumference of the upper rim being at least 1.5 times larger than the first aperture, the hopper having an internal volume of between 20 and 95 liters, wherein the floor plate is capable of being lifted through both the hopper and the upper rim when the floor plate is removed from the annular floor frame.

4. The animal feed spreader of claim 1, wherein the floor plate has a circumference larger than the circumference of the first aperture, and coupling the floor plate to the annular floor frame seals the first aperture except for the area where the second aperture overlaps the first aperture.

5. The animal feed spreader of claim 4, wherein the at least two fastening members are operable to uncouple the floor plate from the annular floor frame while the motor remains coupled to the clamp assembly.

6. The animal feed spreader of claim 5, wherein the plurality of supports of the pedestal assembly further comprises:
    a plurality of columnar supports coupled to the annular floor frame;
    a plurality of beam supports coupled to the plurality of columnar supports, the plurality of beam supports having a generally rectilinear toroidal shape.

7. An animal feed spreader for mounting to a tow hitch of a vehicle, the animal feed spreader comprising:
    an annular floor frame having an inner ring defining a first aperture, the annular floor frame having at least two fastening members;
    a hopper comprising sidewalls coupled to the annular floor frame, at least a portion of the sidewalls defining a funnel-shaped portion of the hopper above the annular floor frame;
    a floor plate removably coupled to the annular floor frame at the at least two fastening members, the floor plate having a second aperture with a circumference that is less than half of the circumference of the first aperture;
    an arm having a first end portion affixed to the floor plate and a second end portion of the arm affixed to a clamp assembly;
    a motor releasably coupled to the clamp assembly with a bottom face of the motor at least 2 cm above the circumference of the second aperture, the motor having a drive shaft traversing both the bottom face of the motor and the second aperture;
    a spinning plate coupled to a distal end portion of the drive shaft opposite the bottom face of the motor, the spinning plate being at least 1 cm below the circumference of the second aperture, wherein the drive shaft and the spinning plate spin when the motor is in an active running state;

a pedestal assembly coupled to the annular floor frame, the pedestal assembly encasing the spinning plate with a plurality of columnar supports and a plurality of beam supports, the plurality of columnar supports coupling the plurality of beam supports to the annular floor frame, wherein the plurality of beam supports has a generally rectilinear toroidal shape with a base that is at least 4 cm below the spinning plate; and a hitch assembly having a proximal end portion coupled to at least one of the pedestal assembly or the annular floor frame, the hitch assembly having a distal end portion operable to couple to the tow hitch of the vehicle.

8. The animal feed spreader of claim 7, wherein the hitch assembly is coupled to at least one of the plurality of beam supports.

9. The animal feed spreader of claim 8, wherein the floor plate has a floor plate circumference where the floor plate seats against the annular floor frame, the floor plate circumference being between 1.03 and 1.4 times larger than the circumference of the first aperture.

10. The animal feed spreader of claim 9, further comprising:

an upper rim of the hopper comprising an upper portion of the sidewalls above the funnel-shaped portion of the hopper, the circumference of the upper rim being at least 1.5 times larger than the first aperture, wherein the floor plate is capable of being lifted through both the hopper and the upper rim when the floor plate is removed from the annular floor frame.

11. The animal feed spreader of claim 7, wherein the pedestal assembly further comprises:

a bash plate coupled to at least two of the plurality of beam supports, the bash plate being positioned directly below the spinning plate.

12. The animal feed spreader of claim 11, wherein the floor plate has a circumference larger than the circumference of the first aperture, and coupling the floor plate to the annular floor frame seals the first aperture except for the area where the second aperture overlaps the first aperture.

13. The animal feed spreader of claim 12, wherein the floor plate is capable of being removed from the annular floor frame while the motor remains coupled to the clamp assembly.

14. An animal feed spreader for mounting to a tow hitch of a vehicle, the animal feed spreader comprising:

an annular floor frame having an inner ring defining a first aperture, the annular floor frame having at least two fastening members;

a hopper comprising sidewalls coupled to the annular floor frame, at least a portion of the sidewalls defining a funnel-shaped portion of the hopper above the annular floor frame;

a floor plate removably coupled to the annular floor frame at the at least two fastening members, the floor plate having a second aperture with a circumference that is less than two-thirds of the circumference of the first aperture;

an arm having a first end portion affixed to the floor plate and a second end portion of the arm affixed to a clamp assembly;

a motor releasably coupled to the clamp assembly with a bottom face of the motor at least 2 cm above the circumference of the second aperture, the motor having a drive shaft traversing both the bottom face of the motor and the second aperture;

a spinning plate coupled to a distal end portion of the drive shaft opposite the bottom face of the motor, the spinning plate being at least 1 cm below the circumference of the second aperture, wherein the drive shaft and the spinning plate spin when the motor is in an active running state;

a pedestal assembly coupled to the annular floor frame, the pedestal assembly having a plurality of supports encasing the spinning plate, each of the plurality of supports having a base, wherein each base of at least three supports of the plurality of supports is at least 4 cm below the spinning plate; and a hitch assembly having a proximal end portion coupled to at least one of the pedestal assembly or the annular floor frame, the hitch assembly having a distal end portion operable to couple to the tow hitch of the vehicle.

15. The animal feed spreader of claim 14, wherein the plurality of supports of the pedestal assembly further comprises:

a first columnar support coupled to the annular floor frame;

a second columnar support coupled to the annular floor frame;

a first beam support coupled to the first columnar support;

a second beam support coupled to the second columnar support; and a third beam support coupled to the first and second beam supports.

16. The animal feed spreader of claim 15, wherein the plurality of supports of the pedestal assembly further comprises:

a fourth beam support coupled to the first and second beam supports, wherein each of the first, second, third, and fourth beam supports are tubular steel.

17. The animal feed spreader of claim 15, wherein the pedestal assembly further comprises:

a bash plate coupled to at least two of the first, second, or third beam supports, the bash plate being positioned directly below the spinning plate.

18. The animal feed spreader of claim 14, wherein the motor remains coupled to the clamp assembly when the floor plate is removed from the annular floor frame.

19. The animal feed spreader of claim 18, wherein the floor plate has a circumference larger than the circumference of the first aperture, and coupling the floor plate to the annular floor frame seals the first aperture except for the area where the second aperture overlaps the first aperture.

20. The animal feed spreader of claim 14, wherein the plurality of supports of the pedestal assembly comprise a protective cage around the spinning plate, the protective cage being shaped and sized to strike a flat ground before the spinning plate strikes the flat ground when the pedestal assembly drops or moves towards the flat ground.

* * * * *